United States Patent
Norsten et al.

(10) Patent No.: US 7,964,271 B2
(45) Date of Patent: Jun. 21, 2011

(54) PHOTOCHROMIC MEDIUM WITH ERASE-ON-DEMAND CAPABILITY

(75) Inventors: Tyler Norsten, Oakville (CA); Gabriel Iftime, Mississauga (CA); Peter Kazmaier, Mississauga (CA); Fazila Seker, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 392 days.

(21) Appl. No.: 12/145,412

(22) Filed: Jun. 24, 2008

(65) Prior Publication Data

US 2009/0318289 A1  Dec. 24, 2009

(51) Int. Cl.
*B32B 7/02* (2006.01)

(52) U.S. Cl. ............ 428/212; 428/195.1; 428/220; 428/332; 428/537.5; 428/913

(58) Field of Classification Search ......... 428/195.1, 428/212, 220, 332, 537.5, 913; 503/201, 503/217
See application file for complete search history.

(56) References Cited

U.S. PATENT DOCUMENTS

| | | | |
|---|---|---|---|
| 3,961,948 A | 6/1976 | Saeva | |
| 6,067,185 A | 5/2000 | Albert et al. | |
| 7,214,456 B2 | 5/2007 | Iftime et al. | |
| 7,300,727 B2 | 11/2007 | Kazmaier et al. | |
| 7,316,875 B2 | 1/2008 | Iftime et al. | |
| 2004/0049040 A1* | 3/2004 | Irie | 544/333 |
| 2005/0244742 A1* | 11/2005 | Iftime et al. | 430/270.1 |
| 2008/0311494 A1* | 12/2008 | Norsten et al. | 430/19 |

FOREIGN PATENT DOCUMENTS

| | | |
|---|---|---|
| EP | 1405891 A1 | 4/2004 |
| JP | 2004-39009 | 2/2004 |
| JP | 2005-250463 | 9/2005 |

OTHER PUBLICATIONS

Pending U.S. Appl. No. 11/762,177, filed Jun. 13, 2007, "Inkless Reimageable Printing Paper and Method," Applicant: Tyler Norsten et al., 42 pages.
International Search Report dated Jul. 8, 2009 for EP Patent Application No. 09 161 886.8, 5 pages.

\* cited by examiner

*Primary Examiner* — Betelhem Shewareged
(74) *Attorney, Agent, or Firm* — Pillsbury Winthrop Shaw Pittman LLP

(57) ABSTRACT

The presently disclosed embodiments are directed to image forming mediums useful for reimageable and transient documents. More particularly, the embodiments pertain to an image forming medium comprising photochromic materials comprising unsymmetrical dithienylethene (DTE) photochromes which provide longer image lifetimes and "erase-on-demand" capability.

22 Claims, 1 Drawing Sheet

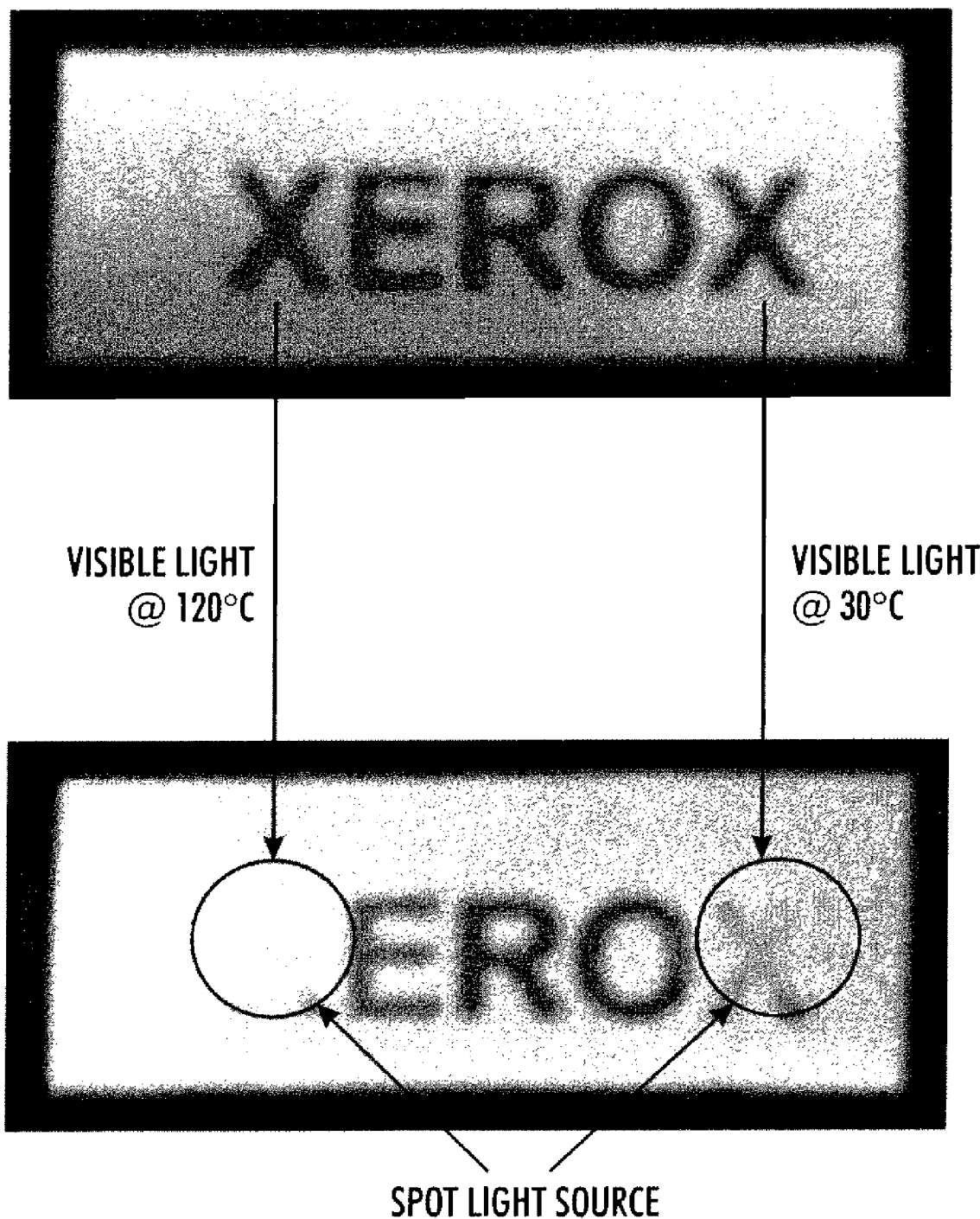

PHOTOCHROMIC MEDIUM WITH ERASE-ON-DEMAND CAPABILITY

BACKGROUND

The present embodiments relate generally to an improved photochromic medium that can be used for reimageable documents. More particularly, the present embodiments are directed to a photochromic material for transient documents which have an "erase-on-demand" capability.

Many paper documents are promptly discarded after being read. Although paper is generally perceived as inexpensive, the quantity of discarded paper documents is enormous and the disposal and recycling of these discarded paper documents raises significant cost and environmental issues. The present invention addresses the above described problem by providing in embodiments an improved photochromic medium for containing the desired image, a new method to prepare such a medium, and a new image forming method.

Imaging techniques employing photochromic materials, that is materials which undergo reversible or irreversible photoinduced color changes are known, for example, U.S. Pat. No. 3,961,948 discloses an imaging method based upon visible light induced changes in a photochromic imaging layer containing a dispersion of at least one photochromic material in an organic film forming binder and is hereby incorporated by reference. These and other photochromic (or reimageable or electric) papers are desirable because they can provide imaging media that can be re-used many times, to transiently store images and documents. For example, applications for photochromic based media include reimageable documents such as, for example, electronic paper documents.

Transient documents and photochromic paper for transient documents have already been reported in U.S. Pat. Nos. 7,300,727 and 7,214,456, where images printed on photochromic paper can be read for a few hours under room light conditions, and the transient documents self-erase with no effort from the user and are ready to be printed again with new images the next day. The resulting blank sheet of paper is ready to be printed again with new information, and the paper may be reusable many times.

A different application for photochromic based media is for reimageable documents, and as mentioned above, for electronic paper documents. Reimageable documents require information to be kept for as long as the user wants, then the information can be erased or the reimageable document can be re-imaged using an imaging system with different information. Written images on electronic paper may be readable for longer period of time such as, for example, many days or weeks. For example, in U.S. Pat. No. 7,316,875, incorporated herein by reference, it was discovered that solutions in acetone of spiropyrans modified with chelating groups in the presence of metallic cations had life-times of at least several days. In contrast, a classical spiropyran molecule, containing no chelating groups, is stable in its colored form for only a few minutes.

However, photochromic materials based on spiroyrans are fast "self-erasing" in that once an image is created, the colorant decays by both thermal and photochemical processes to the colorless state. Longer life-time may be desirable in that an image formed on a medium remains stable for a longer period of time. For example, a user may want to view an image for a longer period than a few hours. This is the case for electronic paper documents, which should maintain a written image for as long as the user needs to view it. The image may then be erased or changed with a different one by the user on command. Thus, there is a continued need for devising a photochromic medium that can be used for reimageable documents with an "erase-on-demand" capability.

SUMMARY

According to aspects illustrated herein, there is provided an image forming medium, comprising a substrate, and an imaging layer coated on or impregnated into the substrate, wherein the imaging layer comprises an imaging composition further comprising a photochromic material dissolved in a solvent or polymeric binder, the photochromic material being represented by

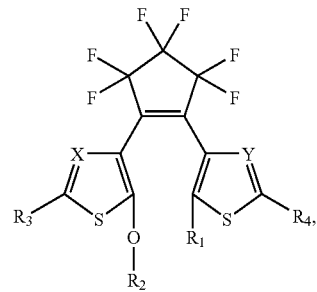

wherein X is nitrogen or carbon, Y is nitrogen or carbon, $R_1$ and $R_2$ are linear, cyclic or branched alkyl groups, $R_3$ and $R_4$ are aromatic or heteroaromatic groups and further wherein the imaging composition exhibits a reversible transition between a colorless state and a colored state.

Another embodiment provides an image forming medium, comprising a substrate, and an imaging layer coated on or impregnated into the substrate, wherein the imaging layer comprises an imaging composition further comprising a photochromic material dissolved in a solvent or polymeric binder, the photochromic material being represented by

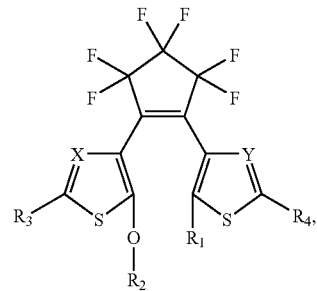

wherein X is carbon, Y is carbon, $R_1$ and $R_2$ are methyl groups, $R_3$ and $R_4$ are phenyl groups and further wherein the imaging composition exhibits a reversible transition between a colorless state and a colored state.

Yet another embodiment, there is provided a method for forming an image, comprising providing an image forming medium comprising a substrate, and an imaging layer coated on or impregnated into the substrate, wherein the imaging layer comprises an imaging composition further comprising a photochromic material dissolved in a solvent or polymeric binder, the photochromic material being represented by

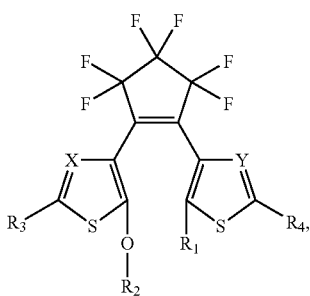

wherein X is nitrogen or carbon, Y is nitrogen or carbon, R$_1$ and R$_2$ are methyl groups, R$_3$ and R$_4$ are phenyl groups and further wherein the imaging composition exhibits a reversible transition between a colorless state and a colored state, and exposing the image forming medium to ultraviolet irradiation of a first wavelength in an imagewise manner to form a visible image.

BRIEF DESCRIPTION OF THE DRAWINGS

For a better understanding, reference may be made to the accompanying FIGURE.

The FIGURE is a photograph of an image forming medium subjected to the reversible transition between colored state and colorless state through the application of light and/or heat in accordance to the present embodiments.

DETAILED DESCRIPTION

In the following description, reference is made to the accompanying drawings, which form a part hereof and which illustrate several embodiments. It is understood that other embodiments may be used and structural and operational changes may be made without departure from the scope of the present disclosure.

The present embodiments relate generally to an improved photochromic medium that can be used for reimageable documents. More particularly, the present embodiments are directed to a photochromic paper for transient documents which have an "erase-on-demand" capability. The erase-on-demand capability is made possible by a photochromic material comprising unsymmetrical dithienylethene (DTE) photochromes dissolved in a solvent or polymeric binder, where the photochrome contains both alkoxy and alkyl groups on opposite arms of the photochrome. The photochromic material exhibits a reversible transition between a colorless (e.g., the complete or substantial absence of visible wavelengths) and a colored state (e.g., the presence of visible wavelengths). Furthermore, exposing the imaging layer to a first stimulus, such as ultraviolet (UV) light irradiation, causes the photochromic material to convert from the colorless state to a colored state. Likewise, exposing the imaging layer to a second stimulus, such as visible light irradiation and optional heat, causes the photochromic material to convert from a colored state to a colorless state.

Photochromism and thermochromism are defined as the reversible photocoloration of a molecule from exposure to light (electromagnetic radiation) and heat (thermal radiation) based stimuli, respectively. Typically photochromic molecules undergo structural and/or electronic rearrangements when irradiated with UV light that converts them to a more conjugated colored state. In the case of photochromic molecules, the colored state can typically be converted back to the original colorless state by irradiating the molecule with visible light. In some cases, thermal energy can also be used to de-colorize a photochrome. If the interconversion is also capable thermally (through application of heat), as is the case in alkoxy-substituted dithienylethenes, spiropyrans, azabenzenes, Schiff bases and the like, the molecules are classified as both thermochromic and photochromic. Photochromic compounds are bi-stable in absence of light whereas photochromic-thermochromic hybrid compounds can fade in the absence of light through a thermal process to the thermodynamically more stable colorless state. To create a stable reimageable document, it is desired to stabilize the colored state, specifically to ambient conditions that the document will encounter in everyday life, such as broad band light and various heating/cooling conditions. For example, U.S. patent application Ser. No. 11/762,177, filed Jun. 13, 2007 to Tyler Norsten et al., discloses use of alkoxy substituted diarylethene dispersed in a solvent or polymeric binder as a photochromic material which provides transient images lasting longer periods and that are reasonably stable to ambient visible light and thermal conditions. However, it is desirable that the photochrome also have the ability to be quickly and quantitatively erased when desired to allow rapid writing, erasing and re-writing of the document.

It has been discovered that asymmetrical DTEs provide erase-on-demand colorants. Furthermore, unsymmetrical DTEs that are appropriately substituted with both a 2-alkoxy thiophene group and a 2-alkyl thiophene group on opposite arms of the photochrome have sufficiently slow thermal and photochemical self-erase, and so can provide extended image life-time (e.g., up to a week depending on conditions). More importantly, these DTEs can also be used with the visible light and/or thermal erase mechanisms to provide rapid erase of the image when desired.

In the present embodiments, there is provided an erase-on-demand reimageable photochromic medium and corresponding printing-erasing system. Customer research has indicated that a reimagable paper media that can be imaged using a UV LED lightbar is highly advantageous if the media has write and erase on demand capability. Unsymmetrical DTE photochromes have been shown to be useful as a reversible imaging material for erase-on-demand transient documents. An appropriately functionalized unsymmetrical DTE provides extended image lifetime over spiropyran-based self-erasing media coupled with the added ability to erase the image employing visible light and/or a heat from an erase device.

The unsymmetrical DTEs described herein have the appropriate level of thermal and light based stability and also achieve an acceptable compromise between extending image lifetime (e.g., from days to weeks) while at the same time allowing the document to be erased quickly with light and or heat (e.g., from about 1 second to about 10 seconds). The unsymmetrical DTEs are represented by the following formula:

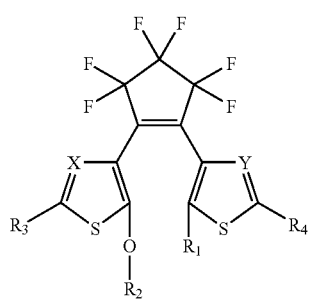

wherein X is nitrogen or carbon, Y is nitrogen or carbon, R₁ and R₂ are alkyl groups linear, branched, cyclic, heterocyclic, containing 1-40 carbon atoms and or heteroatoms, and R₃ and R₄ can be the same or different and can consist of aromatic, heteroaromatic, alkene, alkyne, carbonyl containing such as carboxyl, ester, carbonate, aldehyde, ketone, amide, and the like, and mixtures thereof.

The imaging layer can include any suitable photochromic material and solvent or polymer binder. For example, the photochromic material and solvent or polymer binder are selected such that when the photochromic material is dissolved or dispersed in the solvent or polymer binder, the photochromic material is in its less colored state. However, when the photochromic material is exposed to a first stimulus, such as ultraviolet light, the photochromic material isomerizes to its more colored form. This color change can be reversed, and thus the image "erased" and the photochromic paper returned to a colorless state, by various means such as by applying a second stimulus such as visible light and/or heat that reverses the isomerization reaction. In the colored state, the image can remain visible for a period of two days or more, such as a week or more or a month or more, providing increased usefulness of the photochromic paper.

In embodiments, the photochromic material is an unsymmetrical DTE containing a alkoxy thiophene group and an alkyl thiophene group dispersed in a solvent or polymeric binder, where the photochromic material exhibits a reversible transition between a colorless and a colored state. The photochromic material exhibits photochromism, which is a reversible transformation of a chemical species induced in one or both directions by absorption of an electromagnetic radiation between two forms having different absorption spectra. The first form is thermodynamically stable and may be induced by absorption of light such as ultraviolet light to convert to a second form. The reverse reaction from the second form to the first form may occur, for example, thermally, or by absorption of light such as visible light, or both. Various exemplary embodiments of the photochromic material may also encompass the reversible transformation of the chemical species among three or more forms in the event it is possible that reversible transformation occurs among more than two forms. The photochromic material of embodiments may be composed of one, two, three, four, or more different types of photochromic materials, each of which has reversibly inter-convertible forms. As used herein, the term "photochromic material" refers to all molecules of a specific species of the photochromic material, regardless of their temporary isomeric forms. In various exemplary embodiments, for each type of photochromic material, one form may be colorless or weakly colored and the other form may be differently colored.

In embodiments, the image forming medium, comprises a substrate, and an imaging layer coated on or impregnated into the substrate, wherein the imaging layer comprises an imaging composition further comprising a photochromic material dissolved in a solvent or polymeric binder, the photochromic material being represented by

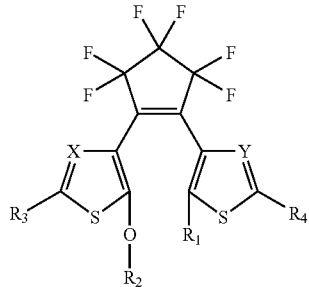

wherein X is nitrogen or carbon, Y is nitrogen or carbon, R₁ and R₂ are methyl groups, R₃ and R₄ are phenyl groups, and further wherein the imaging composition exhibits a reversible transition between a colorless state and a colored state. The photochromic material converts from the colorless state to the colored state upon exposure to light of a first wavelength and converts from the colored state to the colorless state upon exposure to at least one of heat and light of a second wavelength different from the first wavelength. By incorporating this specific photochromic material, the image forming medium is capable of undergoing multiple conversions between the colorless state and the colored state.

In a particular embodiment, the first wavelength is in the range of ultraviolet light while the second wavelength is in the range of visible light. In further embodiments, R₁ and R₂ can be the same or different and selected from the group consisting of alkyl groups, linear, branched, cyclic or heterocyclic, containing 1-40 carbon atoms and or heteroatoms and mixtures thereof, and R₃ and R₄ can be the same or different and can consist of aromatic, heteroaromatic, alkene, alkyne, carbonyl containing such as carboxyl, ester, carbonate, aldehyde, ketone, amide, and the like, and mixtures thereof.

In embodiments, the imaging layer generally comprises a solvent or polymer binder mixture of a photochromic material dispersed or dissolved in a solvent or polymer binder, with the mixture coated on a suitable substrate material, for example paper, or sandwiched between a first and a second substrate material, one of which materials is paper. If desired, the mixture can be further constrained on the substrate material, or between the first and second substrate materials, such as by microencapsulating the solvent mixture, or the like.

These photochromic materials are thus different from other photochromic materials, including other differently substituted or unsubstituted dithienylethenes, in that the materials are generally not readily convertible back from the colored state to the colorless state by exposure to visible light alone, but require exposure to appropriate heating, with or without visible light in order to convert back from the colored state to the colorless state. This allows for a desirable product because the colored state or image can be suitably stable until sufficient heat beyond that of ambient heat induces sufficient energy to allow the structural reorganization to occur. For example, the present embodiments provide a medium in which the colored state remains predominantly in the colored state from about 1 day to about 30 days under ambient indoor lighting conditions.

The image forming material (photochromic material) is dissolved or dispersed in any suitable carrier, such as a solvent, a polymer binder, or the like. Suitable solvents include, for example, aromatic hydrocarbons, straight chain aliphatic hydrocarbons, branched chain aliphatic hydrocarbons, and the like, such as where the straight or branched chain aliphatic hydrocarbons have from about 1 to about 30 carbon atoms. For example, a non-polar liquid of the ISOPAR™ series (manufactured by the Exxon Corporation) may be used as the solvent. These hydrocarbon liquids are considered narrow portions of isoparaffinic hydrocarbon fractions. For example, the boiling range of ISOPAR G™ is from about 157° C. to about 176° C.; ISOPAR H™ is from about 176° C. to about 191° C.; ISOPAR K™ is from about 177° C. to about 197° C.; ISOPAR L is from about 188° C. to about 206° C.; ISOPAR M™ is from about 207° C. to about 254° C.; and ISOPAR V™ is from about 254.4° C. to about 329.4° C. Other suitable solvent materials include, for example, the NORPAR™ series of liquids, which are compositions of n-paraffins available from Exxon Corporation, the SOLTROL™ series of liquids available from the Phillips Petroleum Company, and the SHELLSOL™ series of liquids available from the Shell Oil Company. Mixtures of one or more solvents, e.g., a solvent system, can also be used, if desired. In addition, more polar solvents can also be used. Examples of more polar solvents that may be used include halogenated and nonhalogenated solvents, such as tetrahydrofuran, trichloro- and tetrachloroethane, dichloromethane, chloroform, monochlorobenzene, toluene, xylenes, acetone, methanol, ethanol, xylenes, benzene, ethyl acetate, dimethylformamide, cyclohexanone, N-methyl acetamide and the like. The solvent may be composed of one, two, three or more different solvents. When two or more different solvents are present, each solvent may be present in an equal or unequal amount by weight ranging for example from about 5% to 90%, particularly from about 30% to about 50%, based on the weight of all solvents.

Both compositions dispersable in either organic polymers or waterborne polymers can be used, depending on the used components. For example, for waterborne compositions, polyvinylalcohol is a suitable application solvent, and polymethylmethacrylate is suitable for organic soluble compositions. Suitable examples of polymer binders include, but are not limited to, polyalkylacrylates like polymethyl methacrylate (PMMA), polycarbonates, polyethylenes, oxidized polyethylene, polypropylene, polyisobutylene, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers. In some embodiments, polymethyl methacrylate or a polystyrene is the polymer binder, in terms of their cost and wide availability. The polymer binder, when used, has the role to provide a coating or film forming composition.

Phase change materials can also be used as the polymer binder. Phase change materials are known in the art, and include for example crystalline polyethylenes such as Polywax® 2000, Polywax® 1000, Polywax® 500, and the like from Baker Petrolite, Inc.; oxidized wax such as X-2073 and Mekon wax, from Baker-Hughes Inc.; crystalline polyethylene copolymers such as ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion can be ethylene, propylene, butylenes, pentylene or the like, and including the polyethylene-b-(polyethylene glycol)s and the like; crystalline polyamides; polyester amides; polyvinyl butyral; polyacrylonitrile; polyvinyl chloride; polyvinyl alcohol hydrolyzed; polyacetal; crystalline poly(ethylene glycol); poly(ethylene oxide); poly(ethylene therephthalate); poly(ethylene succinate); crystalline cellulose polymers; fatty alcohols; ethoxylated fatty alcohols; and the like, and mixtures thereof.

In general, most any organic polymer can be used. However, in embodiments, because heat is used to erase the visible image, the polymer can be selected such that it has thermal properties that can withstand the elevated temperatures that may be used for erasing formed images based on the specific alkoxy and alkyl substituted DTE photochrome that is chosen.

In embodiments, the imaging composition can be applied in one form, and dried to another form for use. Thus, for example, the imaging composition comprising photochromic material and solvent or polymer binder may be dissolved or dispersed in a solvent for application to or impregnation into a substrate, with the solvent being subsequently evaporated to form a dry layer.

In general, the imaging composition can include the carrier and imaging material in any suitable amounts, such as from about 5 to about 99.5 percent by weight carrier, such as from about 30 to about 70 percent by weight carrier, and from about 0.05 to about 50 percent by weight photochromic material, such as from about 0.1 to about 5 percent photochromic material by weight.

For applying the imaging layer to the image forming medium substrate, the image forming layer composition can be applied in any suitable manner. For example, the image forming layer composition can be mixed and applied with any suitable solvent or polymer binder, and subsequently hardened or dried to form a desired layer. Further, the image forming layer composition can be applied either as a separate distinct layer to the supporting substrate, or it can be applied so as to impregnate into the supporting substrate.

The image forming medium may comprise a supporting substrate, coated or impregnated on at least one side with the imaging layer. As desired, the substrate can be coated or impregnated on either only one side, or on both sides, with the imaging layer. When the imaging layer is coated or impregnated on both sides, or when higher visibility of the image is desired, an opaque layer may be included between the supporting substrate and the imaging layer(s) or on the opposite side of the supporting substrate from the coated imaging layer. Thus, for example, if a one-sided image forming paper medium is desired, the image forming medium may include a supporting substrate, coated or impregnated on one side with the imaging layer and coated on the other side with an opaque layer such as, for example, a white layer. Also, the image forming medium may include a supporting substrate, coated or impregnated on one side with the imaging layer and with an opaque layer between the substrate and the imaging layer. If a two-sided image forming medium is desired, then the image forming medium may include a supporting substrate, coated or impregnated on both sides with the imaging layer, and with at least one opaque layer interposed between the two coated imaging layers. Of course, an opaque supporting substrate, such as conventional paper, may be used in place of a separate supporting substrate and opaque layer, if desired.

Any suitable supporting substrate, such as paper, may be used. The paper may be, for example, plain paper such as XEROX® 4024 paper, ruled notebook paper, bond paper, silica coated papers such as Sharp Company silica coated paper, Jujo paper, and the like. Other substrates include, but are not limited to, no tear paper and plastics. The substrate may be a single layer or multi-layer where each layer is the same or different material. In embodiments, the substrate has a thickness ranging for example from about 0.3 mm to about 5 mm, although smaller or greater thicknesses can be used, if desired.

When an opaque layer is used in the image forming medium, any suitable material may be used. For example, where a white paper-like appearance is desired, the opaque layer may be formed from a thin coating of titanium dioxide, or other suitable material like zinc oxide, inorganic carbonates, and the like. The opaque layer can have a thickness of, for example, from about 0.01 mm to about 10 mm, such as about 0.1 mm to about 5 mm, although other thicknesses can be used.

If desired, a further overcoating layer may also be applied over the applied imaging layer. The further overcoating layer may, for example, be applied to further adhere the underlying layer in place over the substrate, to provide wear resistance, to improve appearance and feel, and the like. The overcoating layer can be the same as or different from the substrate material, although in embodiments at least one of the overcoating layer and substrate layer is transparent in the visible spectral region to permit visualization of the formed image. The overcoating layer can have a thickness of, for example, from about 0.01 mm to about 10 mm, such as about 0.1 mm to about 5 mm, although other thicknesses can be used. For example, if desired or necessary, the coated substrate can be laminated between supporting sheets such as plastic sheets.

A light absorbing material or medium is optionally present and may be composed of one, two or more light absorbing materials. To explain the purpose of the light absorbing material, one first considers that the photochromic material is capable of reversibly converting among a number of different forms, wherein one form has an absorption spectrum that overlaps with the predetermined wavelength scope. The light absorbing material exhibits a light absorption band with an absorption peak, wherein the light absorption band overlaps with the absorption spectrum of the one form of the photochromic material. The phrase "absorption spectrum" refers to light absorption at a range of wavelengths where the light absorption is greater than a minimal amount. Within the absorption spectrum, there is at least one "light absorption band." The phrase "light absorption band" refers to a range of wavelengths where the absorption is at a relatively high level, typically including an absorption peak where the absorption is at the maximum amount for that "light absorption band." The light absorbing material is selected based on its absorption spectrum compared with the absorption spectrum of the more colorless form of the photochromic material.

In the absence of the light absorbing material, indoor ambient light over a period of time may cause in embodiments the photochromic material in the non-exposed region (that is, not exposed to the imaging light) to undergo the interconversion to the different form where the color of the non-exposed region may match or be similar to the color of the exposed region, thereby causing fading or erasure of the temporary image by the reduction in the color contrast. Incorporating the light absorbing material into or over top of the reimageable medium reduces or minimizes this problem.

Any suitable light absorbing materials can be used. Organic molecules and polymeric materials useful for the light absorbing material, a number of which possess high absorbance below the predetermined wavelength scope, are now described.

Organic compounds which may be useful for the light absorbing material include 2-hydroxy-phenones, like for example 2,4-diyhdroxyphenone, 2-(2-hydroxy-5-tert-octylphenyl)benzotriazole, 2-hydroxy-4-n-octoxybenzophenone, 2-(2'-hydroxy-3',5'-di-tert-amylphenyl)benzotriazole, azobenzene derivatives like for example azobenzene, 4-ethyl azobenzene, 2-chloro-azobenzene, 4-phenylazobenzene, aromatic conjugated systems possessing:
  (a) at least one aromatic ring such as one, two or more aromatic rings having for instance from about 6 carbon atoms to about 40 carbon atoms such as —$C_6H_4$—, and —$C_6H_4$—$C_6H_4$—;
  (b) at least one aromatic ring such as one, two or more aromatic rings conjugated through one or more ethenyl or ethynyl bonds having for instance from about 8 carbon atoms to about 50 carbon atoms such as —$C_6H_4$—CH=CH—$C_6H_4$—, and —$C_6H_4$—C≡C—$C_6H_4$—; or
  (c) fused aromatic rings having for instance from about 10 to about 50 carbon atoms such as 1,4-$C_{10}H_6$ and 1,5-$C_{10}H_6$.

Optionally, one or more aromatic rings possess substituents. Such substituents can be for example atoms like N, O, S, where the valence of the atom is satisfied by bonding with H or a hydrocarbon group, aldehyde (—C(O)—H), ketone (—C(O)—R), ester (—COOR), a carboxylic acid (—COOH); cyano (CN); nitro ($NO_2$); nitroso (N=O); a sulfur-based group (e.g., —$SO_2$—$CH_3$; and —$SO_2$—$CF_3$); a fluorine atom; an alkene (—CH=$CR_2$ or —CH=CHR), wherein each R independently may be for example a straight chain alkyl group having for example 1 to about 20 carbon atoms, particularly 1 to about 12 carbon atoms, such as pentyl, decyl and dodecyl, a branched alkyl group having for example 3 to about 40 carbon atoms, particularly 3 to about 30 carbon atoms such as isopropyl, isopentyl and 2-propyl-pentyl, a cycloalkyl group having for example 3 to about 30 carbon atoms, particularly 4 to 7 carbon atoms in the cycle, such as cyclopentyl and cyclohexyl, an arylalkyl group or alkylaryl group having for example 7 to about 30 carbon atoms such as p-methyl-benzyl, 3-(p-ethyl-phenyl)-propyl and 5-(1-naphthyl)-pentyl.

In specific embodiments, a light absorbing film may be disposed on the imaging layer to prevent the reduction in color contrast. The light absorbing film may be composed of a number of materials, including transparent plastic films and the like. If permanently attached to the image forming substrate the light absorbing material should ideally adsorb maximally in the region of 380 nm-500 nm and adsorb minimally in the region of 250 nm-380 nm to allow for UV-based imaging of the document. Such combinations of materials exhibit acceptable levels of reduction in color contrast when exposed to ambient UV fluorescent light. The light absorbing film has a thickness of from about 0.1 micron to about 1 mm, or from about 0.005 mm to about 1 mm. In this manner, these embodiments provide a manner of achieving coloration in desired areas and eliminating unwanted reduction in color contrast from the UV light present in indoor ambient conditions. In another embodiment, the light absorbing film may function as a detachable cover for the image forming medium in which the yellow film cover can be slipped over of reversibly attached to the image forming medium after the image forming medium is subjected to UV light. In this embodiment, the light absorbing film does not need to be substantially optically transparent in the UV region. Alternatively a light absorbing dye may be incorporated into the polymer overcoat and or into the photochromic medium itself. Any suitable light absorbing dye may be used so long as the dye is soluble or dispersable in the coating formulation selected.

In embodiments where the imaging material is coated on or impregnated into the paper substrate, the coating can be conducted by any suitable method available in the art, and the coating method is not particularly limited. For example, the imaging material can be coated on or impregnated into the paper substrate by dip coating the paper substrate into a solution of the imaging material composition followed by any necessary drying, or the paper substrate can be coated with the imaging composition to form a layer thereof. Similarly, the protective coating can be applied by similar methods.

In another embodiment, the solvent system with the photochromic material can be encapsulated or microencapsulated, and the resultant capsules or microcapsules deposited or coated on the substrate as described above. Any suitable encapsulation technique can be used, such as simple and complex coacervation, interfacial polymerization, in situ polymerization, phase separation processes. For example, a suitable method if described for ink materials in U.S. Pat. No. 6,067,185, the entire disclosure of which is incorporated herein by reference and can be readily adapted to the present disclosure. Useful exemplary materials for simple coacervation include gelatin, polyvinyl alcohol, polyvinyl acetate and cellulose derivatives. Exemplary materials for complex coacervation include gelatin, acacia, acrageenan, carboxymethylecellulose, agar, alginate, casein, albumin, methyl vinyl ether-co-maleic anhydride. Exemplary useful materials for interfacial polymerization include diacyl chlorides such as sebacoyl, adipoyl, and di or poly-amines or alcohols and isocyanates. Exemplary useful materials for in situ polymerization include for example polyhydroxyamides, with aldehydes, melamine or urea and formaldehyde; water-soluble oligomers of the condensate of melamine or urea and formaldehyde, and vinyl monomers such as for example styrene, methyl methacrylate and acrylonitrile. Exemplary useful materials for phase separation processes include polystyrene, polymethylmethacrylate, polyethylmethacrylate, ethyl cellulose, polyvinyl pyridine and polyacrylonitrile. In these embodiments, the encapsulating material is also transparent and colorless, to provide the full color contrast effect provided by the photochromic material.

Where the photochromic material is encapsulated, the resultant capsules can have any desired average particle size. For example, suitable results can be obtained with capsules having an average size of from about 1 to about 1000 microns, such as from about 10 to about 600 or to about 800 microns, or from about 20 to about 100 microns, where the average size refers to the average diameter of the microcapsules and can be readily measured by any suitable device such as an optical microscope. For example, in embodiments, the capsules are large enough to hold a suitable amount of photochromic material to provide a visible effect when in the colored form, but are not so large as to prevent desired image resolution.

In its method aspects, the present disclosure involves providing an image forming medium comprised of a substrate and an imaging layer comprising an alkoxy and alkyl substituted dithienylethene dispersed in a solvent or polymeric binder, where the composition exhibits a reversible transition between a colorless and a colored state. The alkoxy and alkyl groups are positioned on opposite arms of the photochrome. To provide separate writing and erasing processes, imaging is conducted by applying a first stimulus, such as UV light irradiation, to the imaging material to cause a color change, and erasing is conducted by applying a second, different stimulus, such as UV or visible light irradiation, and optionally heat, to the imaging material to reverse the color change. In other embodiments, the erasing is conducted by applying both visible light and heat, or by applying heat alone. Thus, for example, the imaging layer as a whole could be sensitive at a first (such as UV) wavelength that causes the photochromic material to convert from a clear to a colored state, while the imaging layer as a whole could be sensitive at a second, different (such as visible) wavelength and/or to heat that causes the photochromic material to convert from the colored back to the clear state.

In embodiments, heating can be applied to the imaging layer before or at the same time as the light irradiation, for either the writing and/or erasing processes. However, in embodiments, heating is not required for the writing process, as such stimuli as UV light irradiation are sufficient to cause the color change from colorless to colored, while heating may be desired or required for the erasing process to assist in for example increasing the decoloration reaction rate or increasing material mobility for speeding the color change from colored to colorless. When used, the heat raises the temperature of the imaging composition, particularly the photochromic material, to raise the mobility of the imaging composition and thus allow easier and faster conversion from one color state to the other. The heating can be applied before or during the irradiation, or by itself, as long as the heating causes the imaging composition to be raised to the desired temperature during the irradiation or erasing process. Any suitable heating temperature can be used, and will depend upon, for example, the specific imaging composition used. For example, where the photochromic material is dispersed in a polymer or a phase change composition, the heating can be conducted to raise the polymer to at or near its glass transition temperature or melting point, such as within about 5° C., within about 10° C., or within about 20° C. of the glass transition temperature or melting point, although it is desired in certain embodiments that the temperature not exceed the melting point of the polymer binder so as to avoid undesired movement or flow of the polymer on the substrate.

The different stimuli, such as different light irradiation wavelengths, can be suitably selected to provide distinct writing and erasing operations. For example, in one embodiment, the photochromic material is selected to be sensitive to UV light to cause isomerization from the clear state to the colored state, but to be sensitive to visible light to cause isomerization from the colored state to the clear state. In other embodiments, the writing and erasing wavelengths are separated by at least about 10 nm, such as at least about 20 nm, at least about 30 nm, at least about 40 nm, at least about 50 nm, or at least about 100 nm. Thus, for example, if the writing wavelength is at a wavelength of about 360 nm, then the erasing wavelength is desirably a wavelength of greater than about 400 nm, such as greater than about 500 nm. Of course, the relative separation of sensitization wavelengths can be dependent upon, for example, the relatively narrow wavelengths of the exposing apparatus.

In a writing process, the image forming medium is exposed to an imaging light having an appropriate activating wavelength, such as a UV light source such as a light emitting diode (LED), in an imagewise fashion. The imaging light supplies sufficient energy to the photochromic material to cause the photochromic material to convert, such as isomerize, from a clear state to a colored state to produce a colored image at the imaging location, and for the photochromic material to isomerize to stable isomer forms to lock in the image. The amount of energy irradiated on a particular location of the image forming medium can affect the intensity or shade of color generated at that location. Thus, for example, a weaker intensity image can be formed by delivering a lesser amount of energy at the location and thus generating a lesser amount of colored photochromic unit, while a stronger intensity image can be formed by delivering a greater amount of energy to the location and thus generating a greater amount of colored photochromic unit. When suitable photochromic material, solvent or polymer binder, and irradiation conditions are selected, the variation in the amount of energy irradiated at a particular location of the image forming medium can thus allow for formation of grayscale images.

Once an image is formed by the writing process, this results in the formation of a stable colored isomer in the photochromic containing substrate. That is, the isomer forms of the new photochromic materials are more stable to ambient heat and light, as compared to typical photochromics, and thus exhibit greater long-term stability. The image is thereby stabilized to ambient light and heat, and cannot be readily erased in the absence of a specific second stimuli heat and/or light that is more intense than ambient. In embodiments, the image stabilized, and cannot be readily erased by ambient heat or light, and requires elevated temperature and or a light stimulus in order to revert back to the colorless state. The imaging substrate thus provides a reimageable substrate that exhibits a long-lived image lifetime, but which can be erased as desired and reused for additional imaging cycles.

In an erasing process, the writing process is essentially repeated, except that a different stimuli, such as a different wavelength irradiation light, such as visible light, is used, and/or when the photochromic material is optionally heated such as to a temperature at or near a glass transition, melting, or boiling point temperature of the carrier material. For example, the heating can be conducted at a temperature of from above ambient to the highest temperature reasonably sustainable by the substrate, e.g., 25° C. up to about 350° C. Other ranges may encompass from about 100 to about 200° C. or about 80 to about 160° C. The erasing process causes the isomerizations to reverse and the photochromic unit to convert, such as isomerize, from a colored state to a clear state to erase the previously formed image at the imaging location. The erasing procedure can be on an image-wise fashion or on the entire imaging layer as a whole, as desired. The heating step is optional, in that certain compositions can be provided that are erased upon only exposure to the selected stimulus such as light wavelength, while other compositions can be provided that can be erased only under a heating condition, optionally upon exposure to the selected stimulus such as light wavelength. In particular embodiments, both light and heat are applied at the same time to erase.

The separate imaging lights used to form the transient image may have any suitable predetermined wavelength scope such as, for example, a single wavelength or a band of wavelengths. In various exemplary embodiments, the imaging light is an ultraviolet (UV) light source having a single wavelength or a narrow band of wavelengths. For example, the UV light can be selected from the UV light wavelength range of about 200 nm to about 475 nm, such as a single wavelength at about 365 nm or a wavelength band of from about 350 nm to about 370 nm or from about 370 nm to about 390 nm or from about 390 nm to about 410 nm. A combination of separate UV LED light sources may be used in combination to form the transient image For forming the image, the image forming medium may be exposed to the respective imaging light for a time period ranging from about 10 milliseconds to about 5 minutes, particularly from about 30 milliseconds to about 1 minute. The imaging light may have an intensity ranging from about 0.1 mW/cm$^2$ to about 100 mW/cm$^2$, particularly from about 0.5 mW/cm$^2$ to about 10 mW/cm$^2$.

The erasing light is strong visible light of a wavelength which overlaps with the absorption spectrum of the colored state isomer in the visible region. For example the erasing useful light may have a wavelength ranging from about 400 nm to about 800 nm or more preferably form about 500 nm to about 800 nm. The usable visible light of the erasing may be obtained form for example a Xenon or Halogen light source with a bulb having a power from 5 W to about 1000 W or more preferably from about 20 W to about 200 W, which is placed in the proximity of the areas of the document which is to be erased. The exposing erase light may have energy density ranging from about 0 J/cm$^2$ to about 100 J/cm$^2$. Other suitable erasing light sources are a laser or an LED having a wavelength or wavelengths in the visible region of the light spectrum, as defined above. The erasing light may be having a single wavelength or a narrow band of wavelengths.

In various exemplary embodiments, imaging light corresponding to the predetermined image may be generated for example by a computer or a Light Emitting Diode (LED) array screen and the image is formed on the image forming medium by placing the medium on or in proximity to the LED screen for the desired period of time. In other exemplary embodiments, a UV Raster Output Scanner (ROS) may be used to generate the UV light in an image-wise pattern. This embodiment is particularly applicable, for example, to a printer device that can be driven by a computer to generate printed images in an otherwise conventional fashion. That is, the printer can generally correspond to a conventional inkjet printer, except that the inkjet printhead that ejects drops of ink in the imagewise fashion can be replaced by a suitable UV light printhead that exposes the image forming medium in an imagewise fashion. In this embodiment, the replacement of ink cartridges is rendered obsolete, as writing is conducted using a UV light source. The printer can also include a heating device, which can be used to apply heat to the imaging material to erase any existing images. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

For erasing an image in order to reuse the imaging substrate, in various exemplary embodiments, the substrate can be exposed to a suitable imaging light, to cause the image to be erased. Such erasure can be conducted in any suitable manner, such as by exposing the entire substrate to the erasing light at once, exposing the entire substrate to the erasing light in a successive manner such as by scanning the substrate, or the like. In other embodiments, erasing can be conducted at particular points on the substrate, such as by using a light pen, or the like.

According to various exemplary implementations, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. However, in terms of desired maximum color contrast, a desirable color contrast is a dark gray or black image on a light or white background, such as a gray, dark gray, or black image on a white background, or a gray, dark gray, or black image on a light gray background.

In various exemplary embodiments, the color contrast may change such as, for example, diminish during the visible time, but the phrase "color contrast" may encompass any degree of color contrast sufficient to render an image discernable to a user regardless of whether the color contrast changes or is constant during the visible time.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

EXAMPLES

Unsymmetrical photochromes containing various alkoxy and alkyl groups (wherein X and Y are carbon) were synthesized and coated onto substrates.

Coating Procedure:

A solution was made by dissolving an unsymmetrical DTE photochrome in a solution of polymethylmethacrylate (PMMA-polymeric binder) dissolved in toluene ([DTE] $=8.75\times10-2$ M, PMMA=10 wt % in toluene). The DTE photochrome used—where X and Y are carbon, $R_1$ is methyl and $R_2$ is methoxy. The solutions were then spin-coated onto quartz glass slides or applied with a blade coater onto Xerox 4024 paper.

Imaging of Substrate:

The photochromic paper or quartz slides were colored by irradiation with UV light (365 nm) for 10 seconds.

Erasing Procedure:

The colored paper or quartz slides were decolorized (erased) by heating the sample and or by the application of visible light (>450 nm) to the substrate until the color had disappeared. This was measured by UV-Vis in the case of the quartz slides and determined by visual examination in the case of the coated paper.

Erasing Results on Paper:

A spot visible light source was applied to the paper at 30° C. and 120° C. for 10 seconds. The results were captured before and after the procedure (See FIGURE). The erased spot could then be re-imaged by application of UV light.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. An image forming medium, comprising:
   a substrate; and
   an imaging layer coated on or impregnated into the substrate, wherein the imaging layer comprises an imaging composition further comprising a photochromic material dissolved in a solvent or polymeric binder, the photochromic material being an asymmetrical dithienylethene photochrome represented by

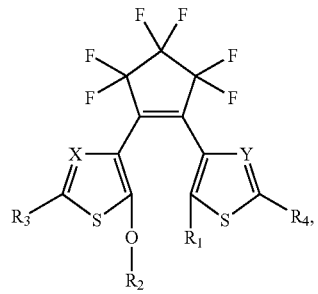

wherein X is nitrogen or carbon, Y is nitrogen or carbon, $R_1$ and $R_2$ are alkyl groups, $R_3$ and $R_4$ are aromatic groups and further wherein the imaging composition exhibits a reversible transition between a colorless state and a colored state.

2. The imaging forming medium of claim 1, wherein the photochromic material converts from the colorless state to the colored state upon exposure to light of a first wavelength and converts from the colored state to the colorless state upon exposure to at least one of heat and light of a second wavelength different from the first wavelength.

3. The imaging forming medium of claim 2, wherein the medium is capable of undergoing multiple conversions between the colorless state and the colored state.

4. The imaging forming medium of claim 2, wherein the first wavelength is in the range of ultraviolet light.

5. The imaging forming medium of claim 2, wherein the second wavelength is in the range of visible light.

6. The imaging forming medium of claim 1, wherein the photochromic material converts from the colored state to the colorless state only upon exposure to heat at a temperature of from above ambient temperature to about the highest temperature reasonably sustainable by the substrate.

7. The imaging forming medium of claim 1, wherein $R_1$ and $R_2$ are the same or different alkyl groups having 1-40 carbon atoms or heteroatoms and are selected from the group consisting of linear alkyl groups, branched alkyl groups, cyclic alkyl groups, heterocyclic alkyl groups, and mixtures thereof.

8. The imaging forming medium of claim 1, wherein $R_3$ and $R_4$ are the same or different aromatic or heteroaromatic group having a functional group selected from the group consisting of an alkenyl, alkynyl, carboxyl, ester, carbonate, aldehyde, ketone, amide, and mixtures thereof.

9. The imaging forming medium of claim 1, wherein $R_1$ is a methyl and $R_2$ is a methyl.

10. The imaging forming medium of claim 1, wherein the imaging composition is applied to the substrate in a layer or as microcapsules.

11. The imaging forming medium of claim 1, wherein the polymeric binder is selected from the group consisting of polyalkylacrylates, polycarbonates, polyethylenes, oxidized polyethylene, polypropylene, polyisobutylene, polystyrenes, poly(styrene)-co-(ethylene), polysulfones, polyethersulfones, polyarylsulfone, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acide, polystyrene-acrylonitrile, polyethylene-acrylate, vinylidenechloride-vinylchloride, vinylacetate-vinylidene chloride, styrene-alkyd resins, and mixtures thereof.

12. The imaging forming medium of claim 1, wherein the solvent is selected from the group consisting of straight chain aliphatic hydrocarbons, branched chain aliphatic hydrocarbons, aromatic hydrocarbons, halogenated and nonhalogenated solvents, and mixtures thereof.

13. The imaging forming medium of claim 12, wherein the solvent is selected from the group consisting of tetrahydrofuran, trichloroethane, tetrachloroethane, dichloromethane, chloroform, monochlorobenzene, toluene, xylenes, acetone, methanol, ethanol, benzene, ethyl acetate, dimethylformamide, cyclohexanone, N-methylacetamide and mixtures thereof.

14. The imaging forming medium of claim 1, wherein the photochromic material is present in an amount of from about 0.5% to about 50% by weight of a total weight of the imaging composition.

15. The imaging forming medium of claim 1, wherein the substrate is selected from the group consisting of plain paper, coated paper, plastic, no tear paper, and mixtures thereof.

16. The imaging forming medium of claim 1, wherein the solvent is provided in the form of encapsulated amounts of the solvent.

17. The imaging forming medium of claim 1, wherein the medium has two sides and the photochromic material is present on the two sides such that the two sides are both reimageable.

18. The image forming medium of claim 1 further comprising a light absorbing material or film disposed within or on the imaging layer and wherein the light absorbing material or film prevents a reduction in color contrast of the image.

19. The image forming medium of claim 18, wherein the light absorbing coating or film has a thickness of from about 0.1 microns to about 1 mm.

20. The imaging forming medium of claim 1, wherein the colored state remains predominantly in the colored from about 1 day to about 30 days under ambient indoor lighting conditions.

21. An image forming medium, comprising:
a substrate; and
an imaging layer coated on or impregnated into the substrate, wherein the imaging layer comprises an imaging composition further comprising a photochromic material dissolved in a solvent or polymeric binder, the photochromic material being an asymmetrical dithienylethene photochrome represented by

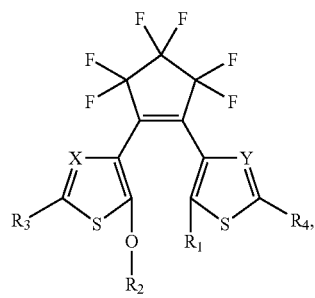

wherein X is carbon, Y is carbon, $R_1$ and $R_2$ are methyl groups, $R_3$ and $R_4$ are phenyl groups and further wherein the imaging composition exhibits a reversible transition between a colorless state and a colored state.

22. An image forming medium, comprising:
a substrate; and
an imaging layer coated on or impregnated into the substrate, wherein the imaging layer comprises an imaging composition further comprising a photochromic material dissolved in a solvent or polymeric binder, the photochromic material being represented by

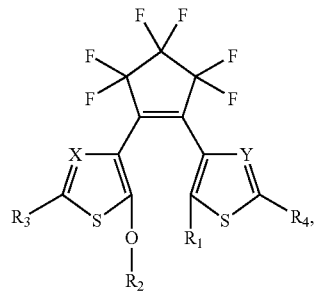

wherein X is nitrogen or carbon, Y is nitrogen or carbon, $R_1$ and $R_2$ are alkyl groups, $R_3$ and $R_4$ are aromatic groups and further wherein the imaging composition exhibits an on-demand transition from a colored state to a colorless state.

* * * * *